United States Patent [19]

Wade et al.

[11] 4,139,499

[45] Feb. 13, 1979

[54] THERMALLY REVERSIBLE AMPHOTERIC ION EXCHANGE RESINS OF IMPROVED DEMINERALIZATION CAPACITY

[75] Inventors: Keith O. Wade, Essendon, Australia; Jerry H. Brown, Menlo Park, Calif.

[73] Assignees: ICI Australia Limited, Melbourne, Australia; Diamond Shamrock Corporation, Del.

[21] Appl. No.: 697,741

[22] Filed: Jun. 18, 1976

[30] Foreign Application Priority Data

Jul. 1, 1975 [AU] Australia .......................... PC2189
May 28, 1976 [AU] Australia .......................... PC6093

[51] Int. Cl.² .................... B01J 1/08; C02B 1/14; C02B 1/40
[52] U.S. Cl. ...................... 521/32; 260/885; 260/886; 528/31
[58] Field of Search ............ 260/2.1 R, 2.2 R, 2.1 M

[56] References Cited

U.S. PATENT DOCUMENTS

| | | | |
|---|---|---|---|
| 3,549,562 | 12/1970 | Mindick | 260/2.5 B |
| 3,637,535 | 1/1972 | Corte et al. | 260/2.1 E |
| 3,808,158 | 4/1974 | Bolto | 260/2.1 R |
| 3,875,085 | 4/1975 | Botts | 260/2.2 R |
| 3,957,698 | 5/1976 | Hatch | 260/2.2 R |
| 3,957,699 | 5/1976 | Solomon et al. | 260/2.1 E |

*Primary Examiner*—Joseph L. Schofer
*Assistant Examiner*—Peter F. Kulkosky
*Attorney, Agent, or Firm*—Cushman, Darby & Cushman

[57] ABSTRACT

A process of making an amphoteric polymeric composition which process comprises dispersing particles of an ion exchange resin comprising either weakly basic or weakly acidic ionogenic groups in a solution comprising one or more monomers containing an ionogenic group, or organic precursor thereof, of opposite charge to the ionogenic groups of the ion exchange resin particle, wherein the ion exchange resin particle and the monomer are not of opposite charge, and a crosslinking agent comprising two or more vinylic or allylic groups; secondly polymerizing the monomer to give a macroporous crosslinked polymer matrix; and thirdly treating the polymeric composition to convert any organic precursors to ionogenic groups to form an amphoteric polymeric composition.

10 Claims, No Drawings

THERMALLY REVERSIBLE AMPHOTERIC ION EXCHANGE RESINS OF IMPROVED DEMINERALIZATION CAPACITY

This invention relates to thermally regenerable ion exchange resins.

Thermally regenerable resins have a potentially important application in water demineralization processes because low-grade heat can be efficiently employed for regeneration and certain of these resins are of use in the desalination of water.

Processes of ion exchange using thermally regenerable resins are described in the publications:

"An Ion Exchange Process with Thermal Regeneration", J. Inst. Engr. Aust. (1965) 37, 193 (Part 1); Aust. J. Chem. (1966) 19, 561 (Part II), 589 (Part III), 765 (Part IV) and 791 (Part V); Aust. J. Chem. (1968) 21, 2703 (Part VI); Desalination (1970) 8, 21 (Part VII); Desalination (1973) 12, 217 (Part VIII); Desalination (1973) 13, 269 (Part IX); Australian Pat. No. 274,029.

We have found a new method of manufacturing amphoteric resins which leads to a new type of amphoteric resin having enhanced thermally regenerable ion exchange properties.

Accordingly we provide a process of making an amphoteric polymeric composition which process comprises dispersing particles of an ion exchange resin comprising either weakly basic or weakly acidic ionogenic groups in a solution comprising one or more monomers containing an ionogenic group, or organic precursor thereof, of opposite charge to the ionogenic groups of the ion exchange resin particle, wherein the ion exchange resin particle and the monomer are not of opposite charge, and a crosslinking agent comprising two or more vinylic or allylic groups; secondly polymerizing the monomer to give a macroporous crosslinked polymer matrix; and thirdly treating the polymeric composition to convert any organic precursors to ionogenic groups to form an amphoteric polymeric composition.

Suitable monomers for the incorporation of particles of a weakly basic ion exchange resin in a macroporous polymer matrix are acrylamide, methacrylamide, acrylonitrile, the lower alkyl esters of acrylic acid, methacrylic acid, ethacrylic acid, fumaric acid, maleic acid, itaconic acid, glutaconic acid, vinylacetic acid, allylacetic acid and mixtures thereof.

Preferred monomers for the incorporation of particles of a weakly basic ion exchange resin in a macroporous polymer matrix are acrylamide, methacrylamide, acrylonitrile, the lower alkyl esters of acrylic acid, methacrylic acid and ethacrylic acid and mixtures thereof.

Suitable monomers for the incorporation of particles of a weakly acidic ion exchange resin in a macroporous polymer matrix are ethenylbenzene, acrylonitrile, acrylamide, methacrylamide and the lower alkyl esters of acrylic acid, methacrylic acid, ethacrylic acid and mixtures thereof.

Preferred monomers for the incorporation of particles of a weakly acidic ion exchange resin in a macroporous polymer matrix are ethenylbenzene, acrylonitrile, acrylamide and methacrylamide.

Throughout this specification and in the claims by lower alkyl we mean an alkyl group containing 1 to 6 carbon atoms.

The conditions necessary to give a macroporous polymer matrix are well known to those skilled in the art and usually comprise polymerization, in a suspension medium containing a dispersing agent, of the required monomers including suitable crosslinking agents in a porogen which is normally an inert solvent in which the monomer is soluble but in which the polymer is essentially insoluble and which is not soluble in the suspension medium.

Macroporous polymers are often termed macroreticular polymers when both macropores and matrix show continuous structure. These polymers possess a network of microscopic channels extending through the mass and, while the microscopic channels are obviously very small, they are large in comparison with the pores in conventional homogeneous cross-linked gels, pores of the latter type not being visible in electron photomicrographs and, as is well known, not being true pores at all (vide Kunin, "Ion Exchange Resins" page 45, et. seq. John Wiley & Sons Inc. 1958). Macroreticular polymers in the dry state usually have surface areas greater than 1 $m^2/g$, and often of the order of 10 $m^2/g$ or greater, with pores whose average diameter is of the order of 20A° or more.

It is conventional to produce these macroreticular polymers in bead form, usually in an overall particle size of about 10 to 900 microns. Further information on the preparation and structuture of macroreticular polymers, which are known materials, may be obtained by referring to British Pat. Specification No. 932,125 and No. 932,126, U.S. Pat. Nos. 3,275,548 and 3,357,158 and Australian Pat. No. 450,143.

In the present invention in order to encapsulate the ion exchange resin particles into the macroporous matrix they are dispersed in a solvent suitable as a porogen for the polymerization and the dispersion is added to a solution of a suitable monomer mixture and initiator. This mixture is then suspended in a suitable medium, preferably aqueous, using one or more suspension agents; the dispersion is maintained by stirring and the mixture polymerized.

The polymer particles to be encapsulated should be of less than 1/10 the diameter of the composite particles prepared in our process. Most preferably the polymer particles are in the size range from 0.1 to 5 microns and the composite particles are in the size range from 250 to 1000 microns.

To facilitate dispersion of the ion exchange resin particles in the monomer solution it is preferable that the particles be in a form compatible with the monomers. Weak base polymers will disperse more readily in organic monomers in the free base form and weak acid polymers will disperse more readily when in the free acid form.

When, as is preferred, the macroporous polymer matrix is formed by suspension polymerization, the mixture of ion exchange resin particles and monomers may be added to the suspension medium which contains a dispersion or suspension agent such as, in the case of an aqueous suspending medium, the ammonium salt of a styrene-maleic anhydride copolymer, carboxymethyl cellulose, polyvinyl alcohol, bentonite or a magnesium silicate dispersion. When this medium is agitated the monomer phase disperses into fine droplets containing the ion exchange resin particles. The size of the droplets depends on a number of factors such as the amount of dispersion agent and the type and rates of agitation. Agitation is continued until polymerization is complete. The polymerized droplets, generally termed "beads", are then separated from the suspension medium and further processed if desired.

A suspension polymerization process generally involves the use of aqueous suspension media.

When employing water-soluble monomers, however, it is not possible to use aqueous suspension media unless the solubility of the monomers is such that they can be salted out. If it is not possible to salt out the monomers, then liquids in which the monomers are insoluble must be employed as suspension media. Such liquids must be chemically inert in the sense that they do not interfere with the polymerization reaction. Aliphatic hydrocarbons are typical of such media. Suitable porogens are solvents in which the monomer is soluble but in which the polymer is essentially insoluble and which are essentially insoluble in the suspension media.

It is well known that atmospheric oxygen acts as an inhibitor of free radical polymerizations. Preferably, therefore, the polymerization is carried out in the absence of atmospheric oxygen.

Suitable catalysts which provide free radicals which function as reaction initiators include benzoyl peroxide, hydroperoxide, tert-butyl hydroperoxide, cumene hydroperoxide, tetralin peroxide, acetyl peroxide, lauroyl peroxide, caproyl peroxide, tert-butyl perbenzoate, tert-butyl diperphthalate and methyl ethyl ketone peroxide.

The amount of peroxidic catalyst required is roughly proportional to the concentration of the mixture of monomers. The usual range is 0.01% to 3% of catalyst with reference to the weight of the monomer mixture. The preferred range is from 0.2% to 1.5%. The optimum amount of catalyst is determined in large part by the nature of the particular monomers selected, including the nature of the impurities which may accompany said monomers.

Another suitable class of free radical generating compounds are the azo catalysts. There may be used, for example, azodiisobutyronitrile, azodiisobutyramide, azobis($\alpha,\alpha$-dimethylvaleronitrile), azobis($\alpha$-methylbutyronitrile), dimethyl, diethyl, or dibutyl azobis(-methylvalerate). These and other similar azo compounds serve as free radical initiators. They contain an —N=N— group attached to aliphatic carbon atoms, at least one of which is tertiary. An amount of 0.01% to 2% of the weight of monomer or monomers is usually sufficient.

Another method of effecting copolymerization is by subjecting the reaction mixture to ultraviolet light in the presence of suitable catalysts at ambient or slightly elevated temperatures. Such catalysts include benzoin and azoisobutyronitrile.

Methods of forming the polymer particles for encapsulation will be obvious to those skilled in the art. Typical methods of suspension polymerization are for example described in Australian patent application No. PB 3612/73 and U.S. Pat. No. 3,716,481. The polymer particles to be encapsulated may also be prepared by crushing larger particles formed for example by bulk polymerization.

The nature of the weakly basic ion exchange resin required in thermally regenerable ion exchange resins is discussed in the publications mentioned hereinbefore and in U.S. Pat. No. 3,645,922.

In general any resin comprising unquaternized amino groups is suitable. Typical weakly basic ion exchange resins suitable for use in thermally regenerable ion exchange resins are crosslinked poly(vinylbenzyldialkylamine), and copolymers derived from N-alkylethyleneimine or N-substituted aminoalkyl acrylates or methacrylates with suitable crosslinking agents.

Preferably the basic resin is a polymer or a copolymer formed from a major proportion of an allylamine monomer.

The nature of the allylamine used to prepare the particles of polymer or copolymer used in the process of our invention is not narrowly critical and the compositions of our invention may be prepared using any amine or mixture of amines having one or more allyl substituents. Suitable allylamines include, for example, allylamine, diallylamine, triallylamine and alkyldiallylamines. Other suitable allylamines include compounds of the general formula II

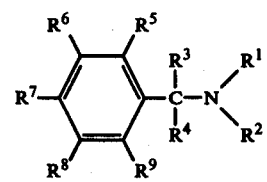

II wherein $R^1$ and $R^2$ are allyl groups; $R^3$, $R^4$, $R^5$, $R^6$, $R^7$, $R^8$ and $R^9$ separately, is a hydrogen or halogen atom or an alkyl, substituted alkyl, aryl, substituted aryl, nitro, dialkylamine alkyl or

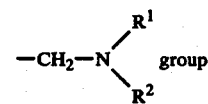

group except that not more than two of $R^3$, $R^4$, $R^5$, $R^6$ and $R^7$ may be the group

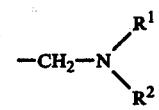

and except that not more than four of $R^3$, $R^4$, $R^5$, $R^6$ and $R^7$ may be hydrogen.

Preferably the olefinically unsaturated group is allyl. A preferred class of compounds of general formula II as defined hereinbefore consists of compounds of general formula III:

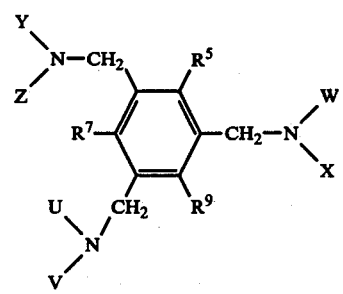

III wherein $R^5$, $R^7$ and $R^9$ are as defined hereinabove and U, V, W, X, Y and Z are allyl. A further preferred class of compounds of general formula II as defined hereinbefore consists of compounds of general formula IV.

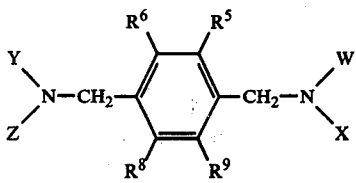

wherein $R^5$, $R^6$, $R^8$ and $R^9$ are as defined hereinabove and W, X, Y and Z are allyl.

Other suitable allylamines include, for example, amines of the general formula V:

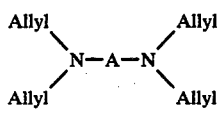

where A is an alkylene group containing 2 to 8, preferably 5 to 7 inclusive carbon atoms, for example, 1,6-bis (N,N-diallylamino) hexane.

Preferred allylamines for use in the preparation thermally regenerable ion exchange resins include, for example: triallylamine, methyldiallylamine, ethyldiallylamine, 1,4-bis (N,N-diallylaminomethyl) benzene, 2,4,6-tris(N,N-diallylaminomethyl) toluene, 1,2,4-tris(N,N-diallylaminomethyl) benzene, 1,6-bis(N,N-diallylamino) hexane, n-propyl diallylamine, benzyl diallylamine.

It will be understood by those skilled in the art that, in order to polymerize the allylamines they must normally be present as salts. Hence all references in this specification to the polymerization of allylamines, even when not specifically described as salts, are to the amines in their polymerizable form.

Suitable salts are the salts of allylamines with strong acids such as, for example, hydrochloric, sulphuric, nitric or phosphoric acid. Generally speaking, the pH, temperature and other conditions associated with the polymerization process may be those known in the art for the polymerization of the appropriate monomers concerned.

Additional crosslinkers may be added to the polymerization system and to obtain adequate crosslinking it is necessary to add a crosslinking agent when amines containing only two or less allyl groups are used. Suitable crosslinking agents are well known in the art and include for example, ethylene glycol dimethacrylate, 1,3-butylene glycol dimethacrylate, divinylbenzene, triallyl cyanurate, the triallyl ether of pentaerythritol and bis-diallylamines such as N,N,N',N'-tetraallyl-1,6-diaminohexane.

Preferably the crosslinking agent is a salt of triallylamine or of a bis(diallylamino)alkane wherein the chain contains from 2 to 8 carbon atoms.

The amount of crosslinking agent required to give a bead suitable for use in thermally regenerable ion exchange is discussed in U.S. Pat. No. 3,645,922. The concentration of the reaction mixture to some extent controls the amount of crosslinking occurring during the reaction.

The nature of the weak acid ion exchange resin particles used for encapsulation by the process of the present invention is not narrowly critical. Small particles of crosslinked polymer with weakly acidic functional groups or derivatives thereof may be prepared using suitable derivatives of ethylenically unsaturated carboxylic acids such as the lower alkyl esters of acrylic acid, methacrylic acid, fumaric acid, maleic acid and glutaconic acid.

Suitable crosslinking agents are compounds with more than one ethylenically unsaturated group and include divinylbenzene, divinylpyridine, divinyltoluenes, divinylnaphthalenes, diallyl phthalate, ethylene glycol diacrylate, ethylene glycol dimethacrylate, divinylxylene, divinylethylbenzene, divinylsulfone, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N,N', methylenedimethacrylamide, N,N'-ethylenediacrylamide, trivinylbenzene, trivinylnaphthalene, polyvinylanthracenes and the polyallyl and polyvinyl ethers of glycol, glycerol, pentaerythritol, resorcinol and the monothio or dithio derivatives of glycols.

The macroporous polymer matrix obtained from the polymerization reaction by the process of the present invention is treated to convert the functional groups of the matrix to functional ion exchange groups to form an amphoteric polymeric composition comprising free carboxyl groups and free amine groups. Any procedure known in the art may be employed which is capable of converting the blocking group to an ion exchange site, but is not capable of destroying the polymer chain.

When a weak base ion exchange resin is encapsulated in a polymer matrix produced from unsaturated carboxylic acid derivative precursors, most such matrices may be converted to a weak acid electrolyte by hydrolysis. Thus for example when an ester, amide, imide, nitrile or acid anhydride is used as the precursor, it may be hydrolysed by treatment of the polymeric composition with aqueous solutions of acid or alkali. We prefer where possible to treat such a polymeric resin with hot aqueous caustic soda solution for several hours. This alkali treatment will also convert precursors formed from tertiary amines and chlorinated carboxylic acids to the original tertiary amino form.

Methods for the conversion of a polymer matrix encapsulating a weak acid ion exchange resin to a weakly basic electrolyte are also well known to those skilled in the art. For example, catalytic reduction of nitriles and amides with hydrogen, reduction of carboxylic acids and esters followed by esterification, and chloromethylation of aromatic groups followed by amination.

Polymeric compositions having appreciable thermally regenerable ion exchange capacity have a molar ratio of amine groups to acid groups in the range from 10:90 to 90:10 and preferably from 20:80 to 60:40.

It is preferable to subject the product resin to a pH equilibration treatment to achieve the optimum ion-exchange performance. Normally, this simply involves stirring the resin in an aqueous salt solution at room temperature (ca. 20° C.) and adding hydrochloric acid until the desired pH level is obtained, care being taken to ensure that the final equilibrium salt concentration is at the required level. The salt concentration employed is that of the water to be treated by the desalination process. The resin is now suitable for use in column operation of a thermally regenerable process, as described in Australian Pat. No. 274,029. For purposes of evaluation, however, the resin may be washed with hot water at ca. 80° C. to obtain it in a regenerated form, and the amount of salt taken up by stirring the regenerated resin in salt solution at room temperature used as a measure of the effective capacity of the system. The time necessary to achieve salt uptake equivalent to 50% of the equilibrium level (the "half time") may be used as a convenient measure of the rate of salt adsorption.

The invention is now illustrated by, but by no means limited to, the following examples:

EXAMPLE 1

Macroporous Acrylic Acid/TAA Resin

Polytriallylamine resin consisting of beads of between 0.5 and 1 microns diameter were washed with 10% sodium hydroxide solution to convert it to the free base form. The resin was then washed with water, ethanol, acetone (twice) and hexane (four times), removing the supernatant liquid at each wash by centrifuging.

The solid polytriallylamine (34 g, 137 meq) was then suspended in 100 mls of isooctane and this was added to a solution of ethyl acrylate (38.2 g: 380 meq), divinylbenzene (6.0 g) and azo-bis-isobutyronitrile (0.5 g).

The above mixture was suspended in an aqueous medium by stirring with a paddle stirrer using a mixture of suspension agents (water (200 ml), methylcellulose (0.4 g), polyvinyl alcohol (0.4 g)). Stirring was maintained at just sufficient speed to fully disperse all of the organic phase in the aqueous phase.

This suspension was heated by immersing the vessel in a constant temperature oil bath at 83° C. maintaining the reaction temperature at between 75°–80° C. for 21 hours.

Reaction allowed to cool and solid collected on a sieve, washed with ethanol.

Hydrolysis

Above solid placed in round bottom vessel with 200 ml of 20% sodium hydroxide solution. The mixture was gently stirred and heated at 80° C. for 21 hours.

The reaction mixture was allowed to cool and the white solid collected on a sieve and washed well with water.

The resin was treated by the method described in U.S. Pat. No. 3,808,158 except that the equilibrium pH was 6.8. The ion exchange properties of the product resin are reported in Example 7.

EXAMPLE 2

This example describes the preparation of polytriallylamine granules.

A mixture of 6.2 g of a 70% triallylamine hydrochloride solution in water, 0.28 g of a 30% hydrogen peroxide solution and 0.036 g of a 15% ferric chloride solution was sealed in a 25 ml flask under nitrogen and heated at 50° C. for 4 hours, by which time the mixture had polymerized to a firm gel.

The gel transferred to a blender and macerated with 1M hydrochloric acid solution. The solid cake obtained by filtration of the slurry was thoroughly washed with 1M hydrochloric acid followed by prolonged washing with 1M sodium hydroxide solution until no more chloride ion could be leached from the resin. The resin was finally rinsed free from sodium hydroxide with water and dried.

The particles were ground to the size range 0.3–5 micron diameter.

The polymer was obtained in 60% yield with an anionic ion exchange capacity of 6.4 meq/g and a swelling ratio (ratio of wet volume: dry volume) of 2.2. The pH titration produced a flat curve with a pH of half neutralisation of 7.9. The change in pH ($\Delta$pH) from 10% neutralisation to 60% neutralisation was 0.3.

EXAMPLE 3

A sample of the polytriallylamine granules prepared in Example 2 was converted to the free base form and then suspended in n-butanol by a series of washings in water, ethanol and acetone.

Encapsulation was carried out by a suspension polymerization process. A slurry of polytriallylamine (11.7 g) in n-butanol (25 ml) was suspended in a solution of ethyl acrylate (20.75 ml; 19.0 g), divinylbenzene (6.6 ml; 6.0 g) cross-linking agent, and azobisisobutyronitrile (0.5 g) initiator. This mixture was then suspended in an aqueous phase comprising polyvinylalcohol (1.6 g) in water (200 ml).

The suspension was maintained by stirring with a teflon paddle (semicircular, 6.5 × 2.5 cm) initially at 200 rpm and after 15 minutes at 150 rpm.

Polymerization was effected by heating this suspension at 75°–80° C. for 21 hours.

The product was subjected to a hydrolysis step in 20% NaOH solution at 75°–80° C. for 21 hours to convert the ethylacrylate ester groups to the functional acid groups.

The product (29.2 g; 86%) consisted of white spherical beads mostly between 0.5 and 1 mm in diameter. No product passed through a British Standard Sieve Size 52 # (screen opening 0.295 mm), but some spheres appeared to be larger than 1 mm. The beads were of moderate hardness.

The ion exchange properties of the resin are reported in Example 7.

The resin water uptake was measured in the $Na^+$, free base form of the resin and, expressed as weight of water absorbed as a percentage of total wet weight, was 70%.

EXAMPLE 4

Example 3 was repeated exactly except that the 11.7 g of polytriallylamine was replaced with 18.2 g of "Diaion" WA30 (Registered Trade Mark for poly[N,N-dimethyl-N(4-ethenylphenylmethyl)amine] ion exchange resin) crushed and sieved to the size range 0.5 to 5 micron diameter.

The ion exchange properties of the resin are reported in Example 7.

The resin water uptake as defined in Example 3, was 70%.

EXAMPLE 5

Example 3 was repeated exactly except that the 11.7 g of polytriallylamine was replaced with 20.3 g of poly(-benzyldiallylamine) crosslinked with 30% N,N,N',N'-tetraallylhexmethylenediamine crushed and sieved to the size range 0.5 to 5 micron diameter.

The ion exchange properties of the resin are reported in Example 7. The resin water uptake, as defined in Example 3, was 70%.

EXAMPLE 6

Example 3 was repeated exactly except that the 11.7 g of polytriallylamine was replaced with 18.0 g of poly(-methyldiallylamine) crosslinked with 30% N,N,N',N'-tetraallylhexamethylenediamine crushed and sieved to the size range 0.5 to 5 microns diameter.

The ion exchange properties of the resin are reported in Example 7. The resin water uptake, as defined in Example 3, was 70%.

EXAMPLE 7

The ion exchange properties of the resins prepared in Examples 1, 3, 4, 5 and 6 were measured by the methods described in U.S. Pat. No. 3,808,158 and are shown in Table I.

TABLE I

ION EXCHANGE PROPERTIES OF RESINS

| Ex. No. | Capacity Acid (meq/g) | Capacity Base (meq/g) | Ratio Acid Base | Salt Uptake (1000 ppm NaCl) meq/ml | Salt Uptake (1000 ppm NaCl) meq/g | Salt Uptake (1000 ppm NaCl) Half Time (mins) | Bulk Density (g/ml) |
|---|---|---|---|---|---|---|---|
| 1 | 3.581 | 2.638 | 1.36 | 0.208 | 1.316 | 6.3 | 0.159 |
| 3 | 4.10 | 2.25 | 1.82 | 0.285 | 1.429 | 4.8 | 0.20 |
| 4 | 3.030 | 1.733 | 1.75 | 0.169 | 0.760 | 1.0 | 0.222 |
| 5 | 4.035 | 1.617 | 2.50 | 0.196 | 1.03 | 5.6 | 0.191 |
| 6 | 3.579 | 2.347 | 1.53 | 0.282 | 1.46 | 3.0 | 0.193 |

We claim:

1. A process of making a thermally reversible amphoteric ion exchange resin having a salt uptake of at least 0.169 meq/ml from 1000 ppm NaCl which process comprises:
   A. dispersing in a suitable suspension medium a mixture of weakly basic ion exchange resin particles of particle size about 0.1 to 5 microns chosen from the group consisting of highly crosslinked polymers of allylamine, diallylamine, triallylamine, N-lower alkyl or N-benzyl-N,N-diallylamine, 1,4-bis (N,N-diallylaminomethyl) benzene, 2,4,6-tris (N,N-diallylaminomethyl) toluene, 1,2,4-tris (N,N-diallylaminomethyl) benzene, 1,6-bis (N,N-diallylamino)hexane, N,N-di-lower alkyl-N-(vinylbenzyl) amine, and mixtures thereof and crosslinked polymers derived from N-lower alkyl ethyleneimines and the N,N-di-lower alkylaminoethyl and N,N-di-lower aklyl aminomethyl esters of acrylic and methacrylic acid; one or more monomers containing an acidic ionogenic group, or organic precursor thereof; a crosslinking agent comprising two or more vinylic or allylic groups; and a porogen which is an inert solvent in which the monomer is soluble but in which the polymer is essentially insoluble and which is not soluble in the suspension medium;
   B. polymerizing the monomers to give beads of particle size about 250 to 1000 microns comprising particles of the weakly basic ion exchange resin embedded in a macroporous crosslinked polymer matrix; and
   C. treating the polymeric composition from B to convert any organic precursors to ionogenic groups to form an amphoteric polymeric composition wherein the molar ratio of basic ionogenic groups to acidic ionogenic groups is in the range from 10:90 to 90:10.

2. A process according to claim 1 wherein the monomer containing an acidic ionogenic group, or organic percursor thereof, is chosen from the group consisting of acrylamide, methacrylamide, acrylonitrile, the lower alkyl esters of acrylic acid, methacrylic acid, ethacrylic acid, fumaric acid, maleic acid, itaconic acid, glutaconic acid, vinylacetic acid, allylacetic acid and mixtures thereof; wherein lower alkyl means an alkyl group containing from 1 to 6 carbon atoms.

3. A process according to claim 1 wherein the resin particles are weakly basic ion exchange resin particles chosen from the group consisting of polymers of triallylamine, crosslinked N,N-di lower alkyl-N-(4-ethenylphenylmethyl)amine, N-benzyl-N,N-diallylamine crosslinked with 1,6-bis(N,N-diallylamino) hexane and N-lower alkyl-N,N-diallylamine crosslinked with 1,6-bis(N-N-diallylamino) hexane and the monomer is chosen from the group consisting of acrylamide, methacrylamide, acrylonitrile, the lower alkyl esters of acrylic acid, methacrylic acid and ethacrylic acid and mixtures thereof; and wherein lower alkyl means an alkyl group containing from 1 to 6 carbon atoms.

4. A process according to claim 1 wherein the molar ratio of basic ionogenic groups of organic precursors thereof to acidic ionogenic groups or organic precursors thereof is in the range from 20:80 to 60:40.

5. An amphoteric resin prepared according to claim 1.

6. An amphoteric resin prepared according to claim 2.

7. An amphoteric resin prepared according to claim 3.

8. An amphoteric resin prepared according to claim 4.

9. A process of making a thermally reversible amphoteric ion exchange resin having a salt uptake of at least 0.169 meq/ml from 1000 ppm NaCl which process comprises:
   A. dispersing in a suitable suspension medium a mixture of weakly basic ion exchange resin particles of particle size about 0.1 to 5 microns chosen from the group consisting of highly crosslinked polymers of allylamine, diallylamine, triallylamine, N-lower alkyl or N-benzyl-N,N-diallylamine, 1,4-bis (N,N-diallylaminomethyl) benzene, 2,4,6-tris (N,N-diallylaminomethyl) toluene, 1,2,4-tris (N,N-diallylaminomethyl) benzene, 1,6-bis (N,N-diallylamino)hexane, N,N-di-lower alkyl-N-(vinylbenzyl) amine, and mixtures thereof and crosslinked polymers derived from N-lower alkyl ethyleneimines and the N,N-di-lower alkylaminoethyl and N,N-di-lower alkyl aminomethyl esters of acrylic and methacrylic acid said polymers being crosslinked at least about 30%; one or more monomers containing an acidic ionogenic group, or organic precursor thereof; a crosslinking agent comprising two or more vinylic or allylic groups; and a porogen which is an inert solvent in which the monomer is soluble but in which the polymer is essentially insoluble and which is not soluble in the suspension medium;
   B. polymerizing the monomers to give beads of particle size about 250 to 1000 microns comprising particles of said weakly basic ion exchange resin embedded in a macroporous crosslinked polymer matrix which is cross-linked at least about 12.1%; and
   C. treating the polymeric composition from B to convert any organic precursors to ionogenic groups to form an amphoteric polymeric composition wherein the molar ratio of basic ionogenic groups to acidic ionogenic groups is in the range from 10:90 to 90:10.

10. An amphoteric resin prepared according to claim 9.

* * * * *